Sept. 15, 1959  H. W. ADDISON  2,904,061
BRINE TANK VALVE
Filed Nov. 19, 1956  2 Sheets-Sheet 1
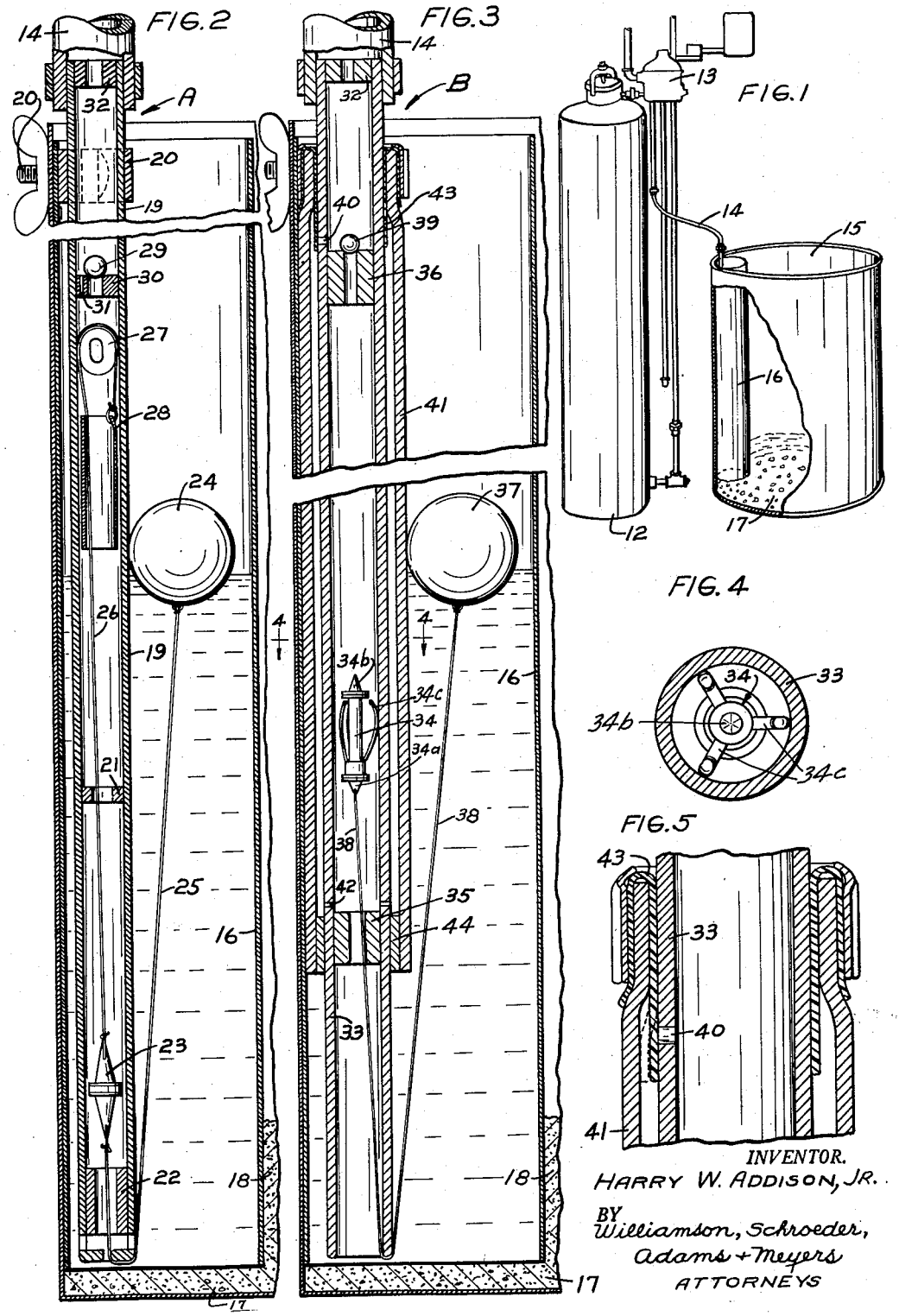
INVENTOR.
HARRY W. ADDISON, JR.
BY
Williamson, Schroeder,
Adams + Meyers
ATTORNEYS Sept. 15, 1959     H. W. ADDISON     2,904,061
BRINE TANK VALVE
Filed Nov. 19, 1956     2 Sheets-Sheet 2
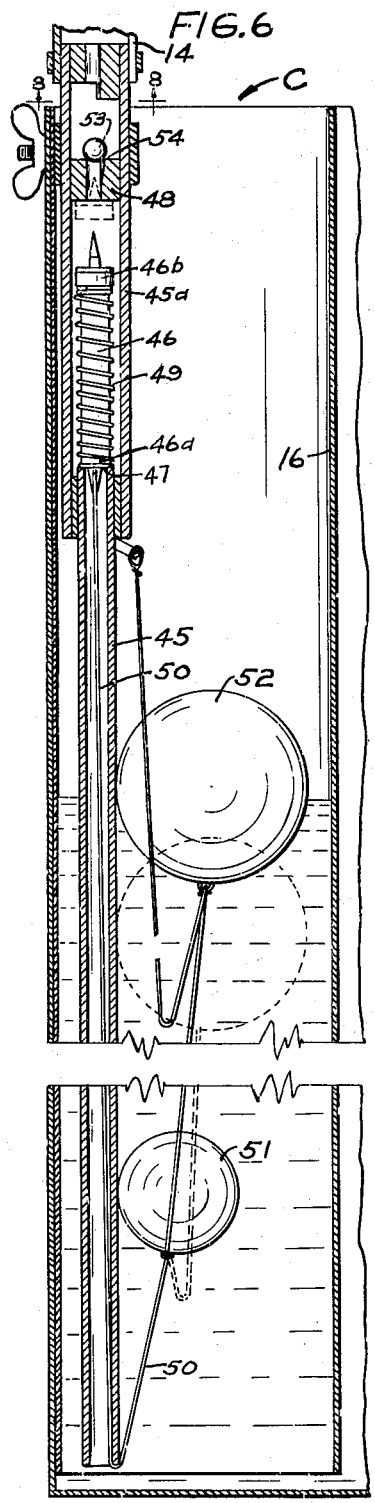
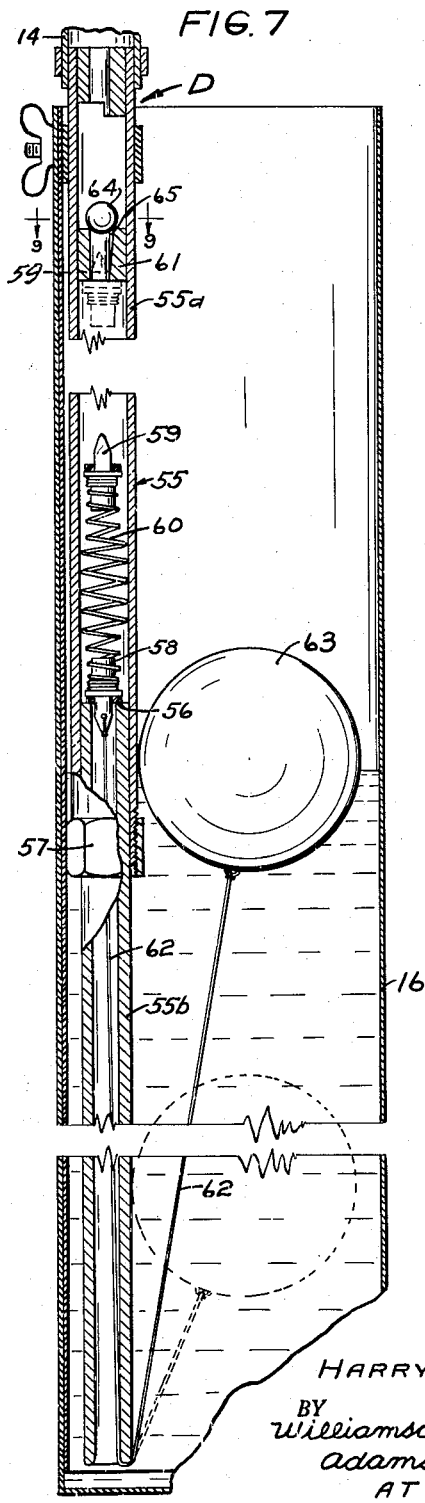
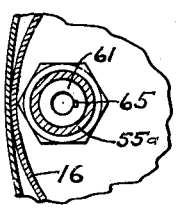
INVENTOR.
HARRY W. ADDISON, JR.
BY Williamson, Schroeder Adams + Meyers
ATTORNEYS

United States Patent Office 2,904,061
Patented Sept. 15, 1959

2,904,061

BRINE TANK VALVE

Harry W. Addison, Marshall, Minn.

Application November 19, 1956, Serial No. 622,958

4 Claims. (Cl. 137—391)

This invention relates generally to valves for controlling the flow into and out of a brine tank for a water softener and more particularly to a valve responsive for actuation to variations in the level within the brine tank.

A number of brine tank valves are presently on the market, but each of these is subject to certain drawbacks such as becoming inoperative due to corrosion when in contact with the salt brine and also many of these have been objectionable due to their high cost of manufacture.

It is an object of my present invention to provide a simple and relatively inexpensive, yet highly efficient valve construction particularly for use in softener brine tanks to control the flow into as well as out of the brine tank and being particularly designed to remain efficiently operative in spite of the corrosive action of the salt brine.

It is another object to provide a brine tank flow control valve which is particularly constructed for operation in response to variations in the liquid level within said brine tank.

These and other objects and advantages of my invention will more fully appear from the following description, made in connection with the accompanying drawings, wherein like reference characters refer to the same or similar parts throughout the several views, and in which:

Fig. 1 is a diagrammatical view showing a softener and brine tank system;

Fig. 2 is a longitudinal vertical section showing one form of my brine tank valve;

Fig. 3 is a similar view of another form of my valve;

Fig. 4 is a horizontal sectional view taken substantially along the line 4—4 of Fig. 3;

Fig. 5 is an enlarged vertical sectional view of the upper portion of the structure shown in Fig. 3;

Fig. 6 is a longitudinal vertical sectional view showing an alternative form of my invention with the valve in lower seated position;

Fig. 7 is a longitudinal vertical section of an alternative form of my invention showing the valve in lower seated position with the spring engaging the side wall of the tube;

Fig. 8 is a transverse horizontal sectional view taken substantially along the line 8—8 of Fig. 6; and Fig. 9 is a horizontal vertical sectional view taken substantially along the line 9—9 of Fig. 7, with the ball removed.

As best shown in Fig. 1, I provide a softener 12 having a softener valve 13. A conduit 14 connects the softener valve 13 with a brine tank 15. The brine tank 15 has a suitable bed of filter material, such as the sand 17, in the bottom thereof, and a protective cylinder 16 of substantially smaller diameter than the tank 15 is mounted within said tank and extends downwardly so that its lower end is submerged below the surface of the sand. Salt granules 18 may then be confined within the tank 15 surrounding the confining or protective cylinder 16 and the sand 17 will prevent these salt granules from rising into said cylinder 16 and will thus act as a filter bed.

Form A of my invention is illustrated in Fig. 2 and consists in an elongated tube 19 which is connected at its upper end to the conduit 14 and extends downwardly into the lower portion of the cylinder 16 as best shown in Fig. 2. This tube 19 may be securely anchored to the cylinder by any suitable means such as the screw clamp assembly 20 disposed at the upper portion of the cylinder and tube. A pair of valve seats 21 and 22 respectively are provided in vertically spaced relation within the tube 19 and a valve element 23 is confined within said tube in a manner to permit the same to be moved freely between the two seats 21 and 22. In this form of my invention, the lower end of the valve is connected with a float 24 by a flexible member such as the nylon cord 25 which passes downwardly through the valve seat 22 and around the lower end of the tube 19 which serves as a guide therefor. The upper end of the valve 23 is connected with a similar cord 26 which is trained about a suitable guiding element 27 and is connected to a free-hanging counterbalancing weight element 28.

The float element 24 rides on the surface and as the water level within the tank 15 and cylinder 16 rises, the float pulls the valve element 23 downwardly until the same seats in the lower seat 22 and thus limits the water level within the tank 15 and the cylinder 16. As soon as the softener valve 13 is shifted to brine intake position, suction is produced in any conventional manner in the conduit 14 to draw brine water up through the tube 19 and lower the level of the liquid in the tank 15 and cylinder 16. The volume of water flowing out through the tube 19 is controlled by the valve 23 since as the level is reduced in the cylinder 16, the float will be lowered and the weight 28 will cause the valve 23 to rise within the tube until the upper end of the valve 23 seats itself in the upper valve seat 21. Thus, a predetermined volume of brine is introduced into the softener 12 to regenerate the same. After completion of the brining operation, the suction in conduit 14 will be cut off by the valve 13 which will ultimately be returned to service position. When the valve 13 is in service position, water is supplied to the tank 15 through the conduit 14 and tube 19. A check valve, such as the ball check 29 seats itself in a suitable valve seat 30 provided for this purpose, and causes the incoming water to flow through a restricted by-pass passage 31 to limit the rate of flow back into the brine tank. This is desirable to prevent the valve 23 from being forced downwardly into seated position in valve seat 22 by an excessive rate of flow of the incoming water. This incoming water fills the cylinder 16 and tank 15 to the level permitted by the float 24 which ultimately causes the valve 23 to seat in the lower seat element 22. A retaining member 32 prevents the ball 29 from being carried out of the tube 19 during the time when the brine is being carried up to said tube.

Form B of my invention, is best shown in Figs. 3, 4 and 5. In this form of my invention, an elongated tubular member 33 is provided instead of the tube 19 previously described. The upper end of the tube 33 is connected with conduit 14 to provide communication with the softener valve 13. The tube 33 has a valve member 34 slidably mounted therewithin, and said valve member is provided at its respective ends with valve elements 34a and 34b which respectively seat in the spaced valve seats 35 and 36 mounted in said tube 33. In form B of my invention, I have eliminated entirely the counterbalancing weight disclosed in form A and have replaced the same with a plurality of resilient tube engaging fingers 34c which are connected to valve 34 and resiliently engage the inside wall of the tube to frictionally prevent movement thereof unless sufficient force is exerted to overcome said frictional resistance. A float 37 is connected with the lower end of the valve as by a flexible nylon line 38 with the intermediate portion of said line passing around the guiding surface formed by the lower end of the tube 33. As the water level rises within the cylinder 16, the valve 34 is pulled downwardly by the float 37 and ultimately seats in the lower valve seat 35. During the withdrawal operation, however, the brine is sucked out of the tube 14 in the same manner as described in form A of my invention, and the valve 34 is shifted upwardly within the tube toward the upper seat 36 as the float 37 is lowered by the removal of brine from the cylinder 16 and tank 15.

In this form of my invention, a ball check valve element 39 is provided in the top of the seat 36 to close the passage through said seat and prevent unrestricted flow of water into the brine tank. This causes the water to flow through a by-pass orifice 40 formed in the side wall of the tube 33, the check valve 39 and down through an annular passage formed by an outer tubular shell 41 which surrounds the inner tube 33. A by-pass orifice 42 is formed in the side wall of tube 33 immediately above the valve seat 35 and permits restricted flow of liquid down through the tube 33. The ends of the shell 41 sealingly engaged against the outside wall of tube 33 as by the flexible rubber sleeve element 43 at the top and the short spacer sleeve 44 at the bottom thereof. The flexible rubber sleeve 43 extends downwardly a sufficient distance to the overly the outlet orifice 40 as best shown in Figs. 3 and 5. This rubber sleeve element 43 serves as a check valve to permit water to flow through passage 40, but prevents water from flowing back therethrough, and thus prevents water or brine from by-passing the valve seat 36 when the valve 34 has been seated thereagainst, but permits restricted flow of the water downwardly into the cylinder 16 and tank 15.

In Fig. 6, still another form of my invention is illustrated, and this form is designated by the reference character C. As in forms A and B, form C of my invention consists in a tube 45 connected at its upper end to the supply conduit 14 and securely anchored within the protective cylinder 16. In this form of the invention, the upper portion of the tube 45 is somewhat enlarged as designated by the numeral 45a to form a valve chamber wherein a valve 46 is confined. Valve elements 46a and 46b are formed on the respective ends of said valve 46. A valve seat 47 is formed at the bottom of the valve chamber, and a valve seat 48 is formed at the top thereof. A soft, resilient member, such as the coil spring 49 surrounds the valve 46 and the lower end thereof seats itself when in lower position against the lower valve seat 47 and yieldably urges the lower valve element 46a upwardly out of seated position. The lower end of the valve 46 is connected to a flexible cord member, such as the nylon cord 50, and a pair of floats 51 and 52 are connected with the other end of said cord 50, the intermediate portion thereof passing around the lower end of the tube 45 as a guide. The floats 51 and 52 are spaced apart on intermediate portions of the cord 50, as best shown in Fig. 6. The lower float 51 does not have sufficient buoyancy to overcome the force of the spring 49, however, the two floats 51 and 52 do have sufficient buoyancy to seat the lower valve element 46a in the lower seat 47 when the level reaches sufficient depth to tighten the section of the cord 50 between the two floats. The upper end of the seat 48 has a ball check arrangement generally similar to that previously disclosed wherein a ball 53 is provided and is seated at the upper end of the valve seat 48. A by-pass groove 54 is formed in the valve seat 48 to provide a restricted passage to meter the flow back into the brine tank when the ball check 53 is in seated position. The use of the two floats 51 and 52 permits the maximum water level in the brine tank to be easily varied. When the softener control valve imposes a suction on the tube assembly 45 through the conduit 14, the valve 46 will be lifted out of valve seat 47 and brine will be drawn out of the brine tank. Obviously, as the brine level drops within the tank, the float 52 will drop with it. The buoyancy of the lower float 51 will be overcome by spring 49 but will prevent the upper valve 46b from seating in the upper seat 48 until said float 51 drops a sufficient distance to permit the valve member 49 to shift upwardly and seat the upper valve element 46b. Obviously, the valve element 46 is not required to move the same distance that the water level drops as in forms A and B, but rather moves only substantially the same distance that the lower float 51 moves with the variations in the water level. Thus it is a relatively simple matter to control the liquid level in the brine tank and thereby control the available brine supply by merely adjusting the position of the upper float 52 on the cord 50.

In Fig. 7, form D of my invention is illustrated wherein another means for adjusting the brine tank water level is provided. A telescoping tube assembly 55 is provided which has an upper section 55a and a lower section 55b wherein the upper end of the lower section forms the lower valve seat. A sealing collar 57 tightly seals the two sections together in the desired adjusted position. A slightly modified valve assembly is shown having two separate valve elements 58 and 59 interconnected by a coil spring 60, the center portion of which is normally expanded circumferentially sufficiently to frictionally engage the inside wall of tube section 55a. However, when the same is extended longitudinally, the lateral dimension of the spring 60 will be reduced sufficiently to permit the two valve elements to be shifted easily within the tube section 55a. An upper valve seat 61 is provided to receive the upper valve element 59 when the same is shifted upwardly within the tube section 55a. A flexible element such as the cord 62 is connected with the lower valve element 58 as best shown in Fig. 7 and passes downwardly through the lower tube 55b and around the lower end thereof as a guide and upwardly to a float member 63 which is connected at the other end thereof. A ball check valve 64 similar in construction to the ball check arrangement disclosed for form C of my invention is illustrated and a restricted metering groove 65 is provided for limiting the flow of water downwardly through the check valve arrangement. As the water flows down through the tube 55, the float 63 will rise with the water level and will pull the lower valve element 58 downwardly stretching the spring 60 longitudinally sufficiently to permit the valve assembly to move freely downwardly through the upper tube section 55a. While the water is being sucked out of the cylinder 16 through the tube 55, the flow of the water upwardly through the tube combined with the suction force will stretch the spring sufficiently to permit the valve assembly to rise in the tube in accordance with the drop in the brine level within the cylinder 16 and the brine tank 15. In other words, the cord 62 will remain taut at all times and thus the spring 60 will remain in longitudinally extended, laterally contracted position to permit the upper valve element 59 to pass upwardly as the float 63 is lowered within the cylinder 16. Figs. 8 and 9 show the check valve construction 64 and 65 and the telescopic arrangement between the two tube sections 55a and 55b.

It will be seen that I have provided a relatively simple yet highly efficient brine tank valve for water softeners and the like which will produce reliable and long service free operation while permitting the same to be constructed with a minimum of cost.

It will, of course, be understood that various changes may be made in the form, details, arrangement and proportions of the parts without departing from the scope of my invention which consists of the matter shown and described herein and set forth in the appended claims.

What I claim is:

1. An adjustable valve for softener brine tanks and the like comprising an upstanding hollow tube, a pair of spaced apart valve seats disposed within the tube, a valve assembly working in said tube between said valve seats, yieldable means urging said valve out of seated position in the lower seat, a flexible interconnection element having one end attached to said valve assembly, guiding means for said interconnection element formed on said tube in spaced relation below the lower valve seat, a pair of float elements connected to said interconnection element in spaced apart relation thereon, the spacing between said float elements being adjustable on said interconnection element, the lower float element having sufficient buoyancy to prevent the valve from seating in the upper seat but insufficient buoyancy to overcome the yieldable means urging said valve assembly out of lower seated position.

2. An adjustable valve for softener brine tanks and the like comprising an upstanding hollow tube assembly including a pair of longitudinally adjustable tube sections, the lower section being telescopically received within the upper section and provided with a valve seat at the upper end thereof, a valve seat provided within the upper tube section in spaced relation above the upper end of the lower tube, a valve assembly working in said upper tube section between said valve seats a flexible interconnection member connected at one end to said valve assembly, a float connected to the other end thereof, guiding means for said interconnection member on the lower tube section disposed in spaced relation below the upper end thereof and disposed between said float and said valve assembly to permit said interconnection element to pass therearound during rising and falling of the liquid level on which said float is supported, adjustment of said two tube sections longitudinally varying the spacing between said valve seats and the maximum elevation of said float to permit the level to be adjustably controlled within the brine tank in which said tube assembly and float is mounted.

3. A valve for softener brine tanks and the like comprising an upstanding elongated hollow tube adapted to be connected at its upper end to a combined liquid supply and withdrawal conduit, a pair of spaced apart valve seats mounted within said tube, a valve interposed between said seats and of a size to move from one seat to the other in response to engagement by the flow of liquid within said tube, a float element disposed outside of said tube, guiding means formed on said tube in spaced relation below the lower valve seat, a flexible interconnection element interconnecting said valve element and said float and passing around said guiding means so that said float urges said valve element downwardly into seat relation against the lower seat whenever the liquid level supporting said float rises above a predetermined limit but permitting the flow of water upwardly through said tube to seat said valve against the upper valve seat when said liquid level drops to a predetermined lower limit, and means for retarding the movement of said valve consisting in a friction mechanism cooperatively associated with said valve for frictional engagement against the inside of said tube to produce a predetermined frictional resistance to movement of the valve within the tube and prevent the water flow downwardly through the tube from seating the valve against the lower valve seat until the water level reaches a predetermined upper limit.

4. The structure set forth in claim 3 wherein said friction mechanism consists in a laterally expandable friction element contractable upon extension thereof and laterally expandable upon compression whereby the pulling action of the float contracts said restraining means and pushing action expands the same.

References Cited in the file of this patent

UNITED STATES PATENTS

| | | |
|---|---|---|
| 1,407,993 | Earl | Feb. 28, 1922 |
| 2,710,018 | Wolfe | June 7, 1955 |
| 2,716,422 | Whitlock | Aug. 30, 1955 |